United States Patent
Köethmann et al.

[11] 4,054,872
[45] Oct. 18, 1977

[54] PULSE DOPPLER RADAR RECEIVER HAVING A MOVING CURVE TRANSIT TIME FILTER

[75] Inventors: Wolfgang Köethmann, Feldafing; Heinz-Dieter Güenther, Munich, both of Germany

[73] Assignee: Siemens Aktiengesellschaft, Berlin & Munich, Germany

[21] Appl. No.: 709,921

[22] Filed: July 29, 1976

[30] Foreign Application Priority Data

Aug. 8, 1975 Germany .......................... 2535462

[51] Int. Cl.$^2$ ............................................. G01S 9/42
[52] U.S. Cl. ....................................................... 343/7.7
[58] Field of Search ...................... 343/7.7, 7 A, 5 VQ

[56] References Cited

U.S. PATENT DOCUMENTS

3,950,748   4/1976   Busy ................................. 343/7 A

*Primary Examiner*—T.H. Tubbesing
*Attorney, Agent, or Firm*—Hill, Gross, Simpson, Van Santen, Steadman, Chiara & Simpson

[57] ABSTRACT

A pulse Doppler radar receiver has a moving curve transit time filter which provides a differentiating effect, whereby in order to avoid interferences due to overdriving ahead of the moving curve filter, the reception signals are limited temporarily, preferably with the help of an analog-digital converter, and specially produced auxiliary voltage values are inserted during the duration of limitation, as signal voltages, which are to be processed. The auxiliary voltage values are formed of the original signal path which is provided before limitation in such a way that, during limitation, the original voltage values are changed by an opposite voltage to such an extent that the remaining auxiliary voltage values do not cause overdriving, and the envelope of the original signal path is thereby maintained.

7 Claims, 11 Drawing Figures

PULSE DOPPLER RADAR RECEIVER HAVING A MOVING CURVE TRANSIT TIME FILTER

BACKGROUND OF THE INVENTION

1. Field of the Invention

This invention relates to a pulse Doppler radar receiver having a moving target indicating filter which provides a differentiating effect, whereby, in order to avoid interferences due to overdriving, a limitation of the received signals is temporarily effected ahead of the transit time filter, preferably with the help of an analog-digital converter, and whereby specially produced auxiliary voltage values are inserted during the duration of limitation as signal voltages in order to be processed further in accordance with well-known techniques.

2. Description of the Prior Art

The British Pat. No. 1,350,177, in addition to disclosing well-known processing techniques such as mentioned above, discloses a pulse Doppler radar receiver in which a limiter is provided, or limitation occurs, respectively. If a moving target indicating filter is utilized, there is the danger that false signals may occur due to limitation, imitating a moving target. In order to avoid these interferences, an auxiliary signal value is fed in during limitation and having approximately the level of the output signal of the moving curve transit time filter from a previous receiving period. During limitation, a constant voltage value will thus be provided for the evaluation, determined by the amount of the limitation voltage. Therefore, the interferering influences, which may occur due to sharp limitation, can be avoided.

Due to the application of constant auxiliary voltage values during limitation, however, the useful voltage signal portion (for example of moving target echo signals), however, are also more or less subjected to interference. This decrease of sensitivity may prevent indication of targets, in particular very weak targets.

SUMMARY OF THE INVENTION

The object of the present invention is to overcome the above difficulties and maintain the sensitivity of radar receivers as high as possible, even in the case of limitation.

According to the invention, which relates to a pulse Doppler radar receiver of the type generally mentioned above, the above objectives are achieved in such a way that the auxiliary voltage values are formed from the original signal form provided before the limitation in such a way that, during the duration of limitation, the original voltage values are decreased by an opposite voltage to such an extent that the remaining auxiliary voltage values do not cause overdriving, and the envelope of the original signal path is thereby maintained.

Since the shape of the original signal path is approximately maintained due to the opposite voltage, and thus the very weak signal portions of moved targets is also maintained unchanged, the sensitivity of the radar device will be particularly fully maintained with respect to the detection of moved targets.

BREIF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
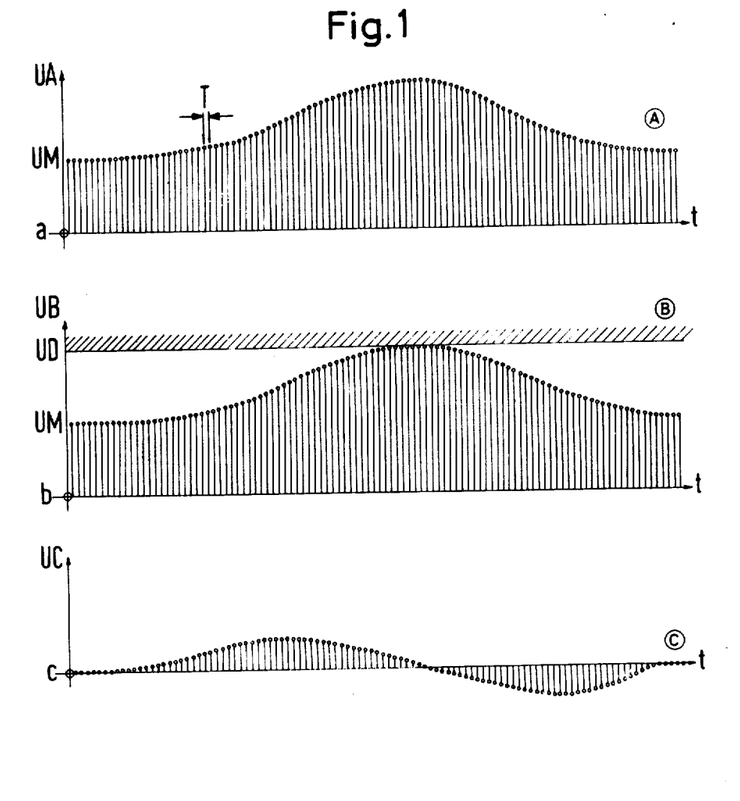
FIG. 1 is a graphic illustration of the form of echo signals without limitation.

In line $a$ of FIG. 1 (as well as in the subsequent figures 2 through 8), the samples of echo signals have been respectively illustrated as they may occur when a target is scanned by the antenna arrangement. These samples having the voltage UA and the sensing period T may either be the individual pulses of echo signals or may be obtained through a so-called sample and hold circuit out of a continuous signal. Such signal shapes, for example in the sample circuit in accordance with FIGS. 9 and 10, occur at the position of the circuit referenced A. The voltage increases gradually when a target is scanned, starting at the value UM, and then decreases back to the value UM. It is also possible that a decrease occurs during a target scanning—the curved path would then be extended downwardly around the value UM. The insertion of the voltage value UM serves for providing unipolar signals in all cases for further processing.

It is illustrated in line $b$ that the signal paths having the voltages UB is barely below a limitation voltage UD, so that the shape of the signal path is not changed. This signal path, in FIG. 9, (as well as in the subsequent FIGS. 2 through 7) occurs at the position referenced B, thus, for example, behind an analog-digital converter which serves as a limiter. This is due to the fact that the analog-digital converters have only a finite dynamic characteristic. If analog circuits are employed, a limitation may also occur. If a lowering would occur during a target scanning, then the lower limitation voltage would be $UB = 0$. For purpose of simplification, a subsequent increase of signal voltages during the signal scanning process is always assumed.

The line $c$ illustrates the signal path when the signal samples of a fixed target in accordance with the line $b$ is supplied to a differentiating system such as a moving target indicating delay circuit filter. These signal samples, in the case of the circuit constructed in accordance with FIG. 9 (in the same manner as with the subsequent FIGS. 2 through 7) occur at the position referenced C, thus after the transit time filter. It should be pointed out that the scale of the ordinate UC in the line $c$ is increased, in comparison with the line $a$ and $b$, since the very small different values between the successive sensing samples could otherwise hardly be represented. The voltage UC in accordance with the line $c$ has a zero passage at a position where the signal paths in accordance with the lines $a$ and $b$ reach a maximum. Fixed target echo signals are greatly weakened in this manner.

Figure 2:
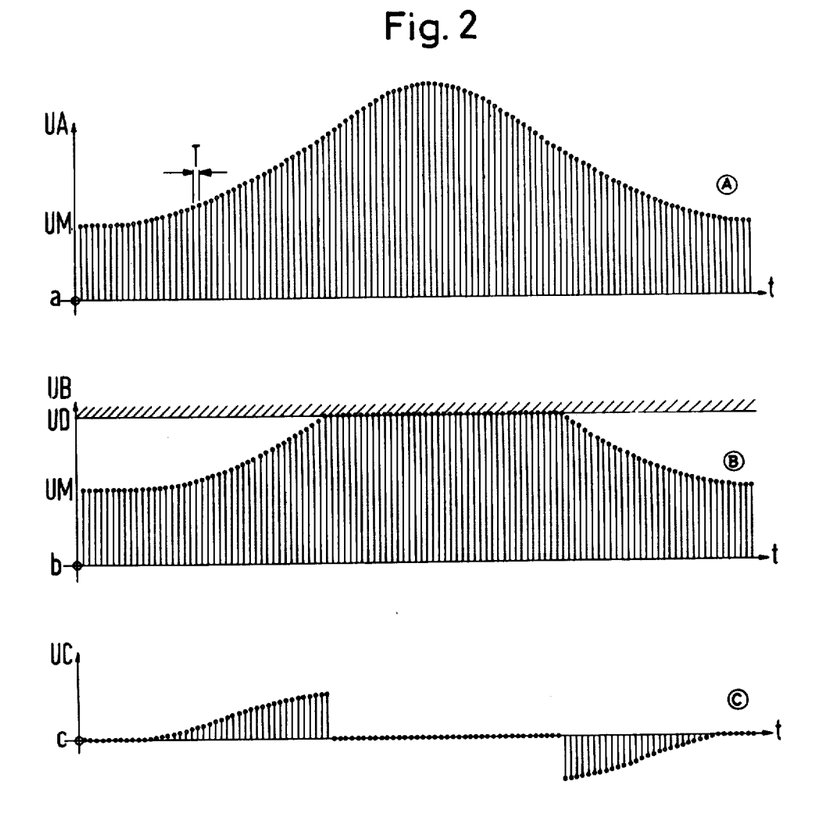
FIG. 2 is a graphic illustration of the form of echo signals with limitation.

In the case of the arrangement in accordance with FIG. 2, it is presumed that limitation occurs. This is the case when the voltage UA in accordance with line $a$ exceeds the limitation voltage UD in accordance with the line $b$. During the limitation, the signal value at the output of the differentiating system, thus, for instance, the moving curve transit time filter is zero and the path illustrated in the line $c$ results for the voltage UC.

Figure 3:
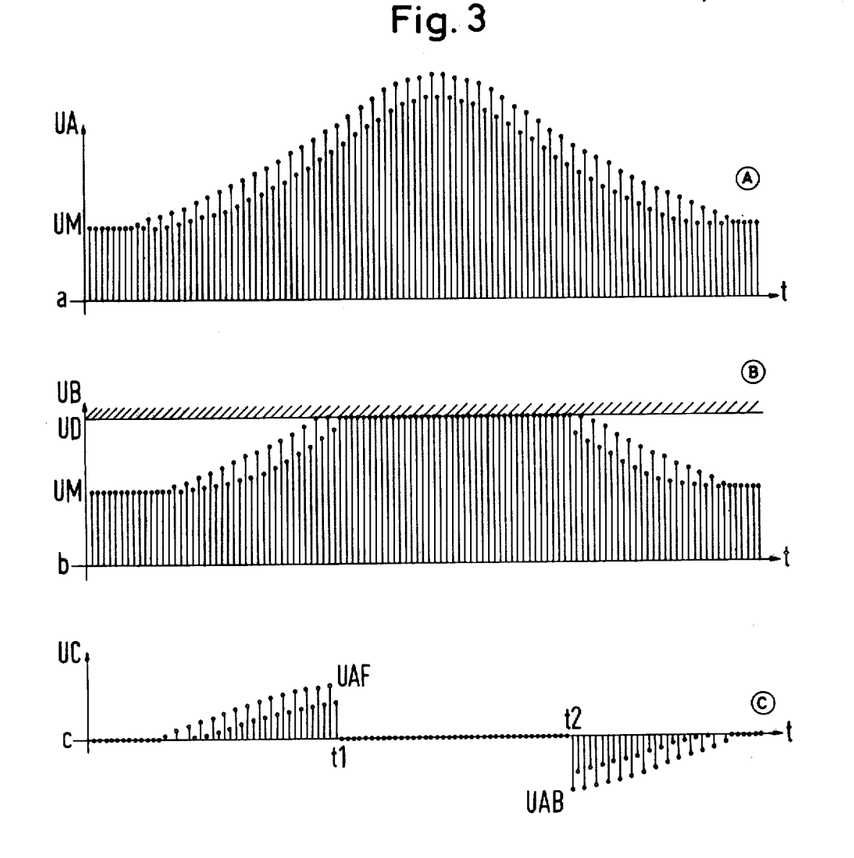
FIG. 3 is a graphic illustration of the form of echo signals having superposed moving target echo signals.

In the case of the signal path in accordance with FIG. 3, it is assumed that in the line $a$ a moving target signal is also superimposed onto the fixed target signal.

An oscillating voltage portion results which causes differently large sensing values. Due to the limitation in accordance with line $b$, a signal path occurs in line $c$ which corresponds to that of FIG. 2, i.e. the resulting voltage, while the limitation voltage UD in accordance with line $b$ is exceeded, is zero. Thus, all information about the moving target is suppressed as long as a limitation is employed (from the time $t1$ to the time $t2$). The same holds true, incidentally, when a constant auxiliary voltage value is employed in the place of the value zero during limitation.

Figure 4:
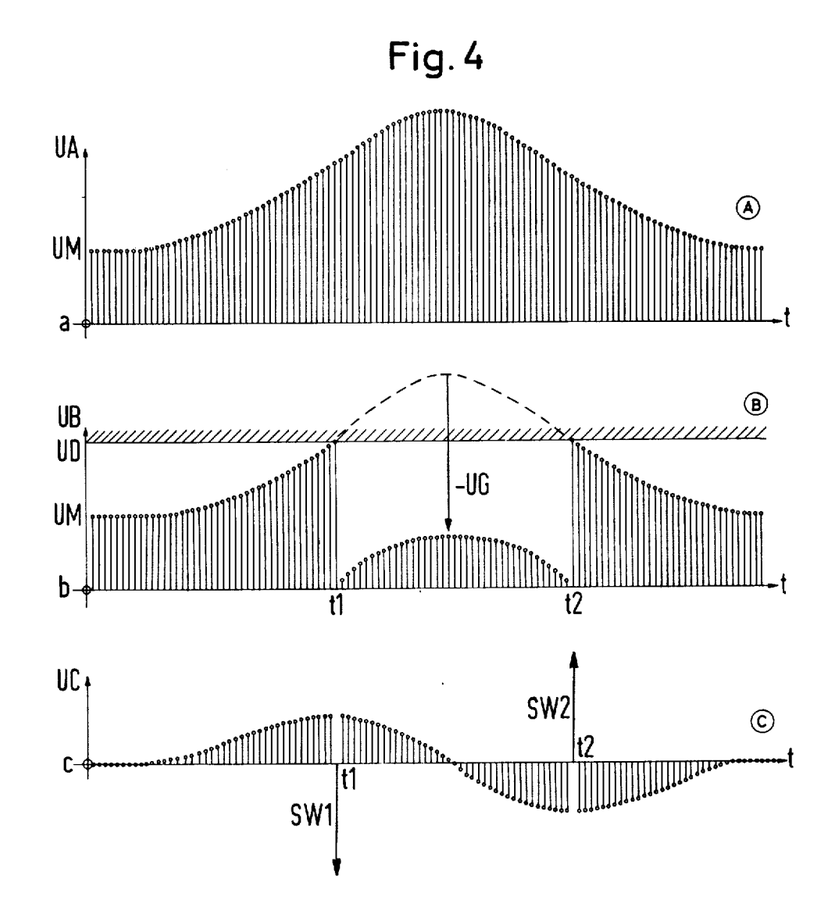
FIG. 4 is a graphic illustration of the form of echo signals in the case of the introduction of an opposite voltage during limitation.

In the case of the signal path illustrated in FIG. 4, the limitation voltage UD in accordance with line $b$ is also exceeded. During the time of the limitation, i.e. from the time $t1$ to $t2$, however, the voltage value does not remain constant on the value UC, as opposed to that illustrated in FIG. 2. In accordance with the present invention, the procedure is, rather, such that a fixed voltage value is subtracted from the original signal in accordance with line $a$. This is indicated by the arrow $-UG$. Therefore, the path of the signal voltage in accordance with line $a$ is also maintained in line $b$ during the time from $t1$ to $t2$. The decrease of the voltage value in accordance with line $a$ in the range of the limitation voltage in accordance with line $b$ is effected in such a way that, if possible, the limitation voltage UD is not again exceeded during the time from $t1$ through $t2$.

If, as mentioned above in connection with FIG. 1, a decrease of the voltage occurs during a target scanning, then the voltage value, which is below $UB = 0$, would have to be increased by an opposite voltage of $+UG$.

It can be seen from line $c$ that the voltage UC assumes an even path after the differentiating system, thus, for example, the moving target indicating filter, whereby this path essentially corresponds to that of FIG. 1, where a limitation has not occured. However, two interference pulses occur which are referenced SW1 and SW2. These are due to the fact that the very large voltage value which occurs as the last value before the beginning of limitation at the time $t1$, and the subsequent very small voltage value after the limitation (in the delay circuit filter) are substrated from one another. The same problem occurs at the end of limitation, where, at the time $t2$, the very small last voltage value from the voltage decrease by the value $-UG$ and the subsequent very large voltage value which has not been limited or decreased, are subtracted from one another. These two opposite polarity interference pulses SW1 and SW2, in the case of subsequent moving curve evaluation circuits, offer difficulties in the case of the subsequent moving curve evaluation circuit since they exceed thresholds and are possibly indicated as moving targets. They may cause false indication of a moving target due to limitation. A remedy consists in providing threshold value circuits having correspondingly large threshold values. This, however, entails a drawback in that the sensitivity of the entire circuit arrangement decreases. A particularly advantageous solution for suppressing such interference pulses has been illustrated in FIGS. 9 through 11, as will be discussed below.

Figure 5:
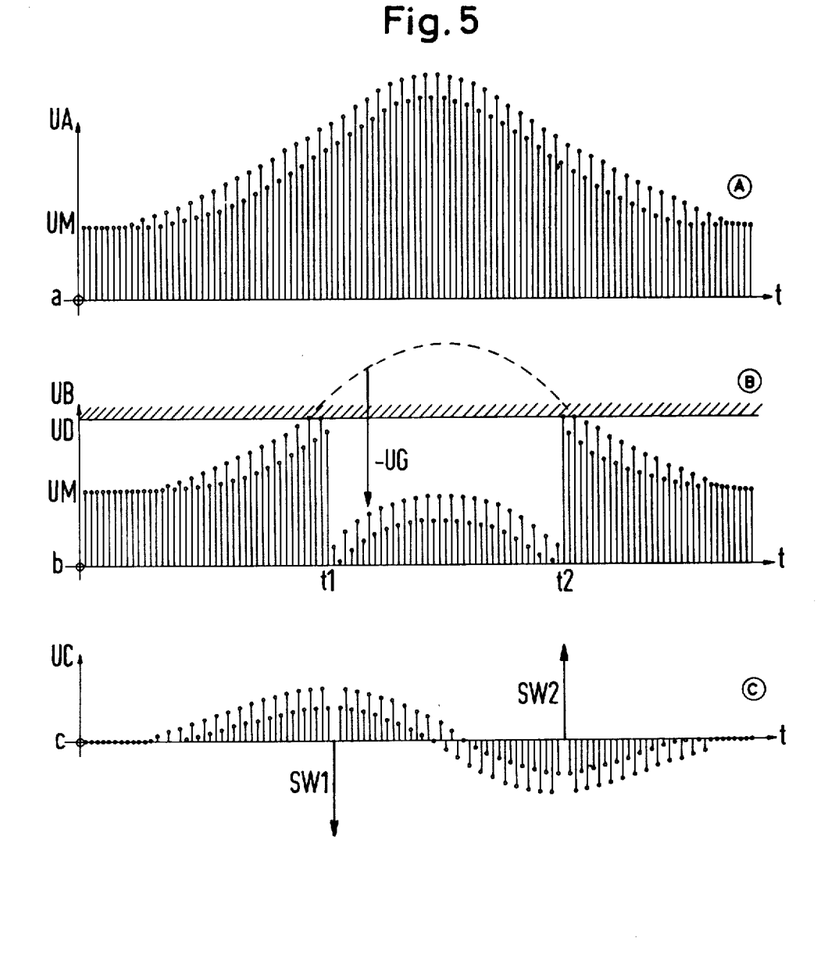
FIG. 5 is a graphic illustration of the form of echo signals in the case of additionally present moving target echo signals and the introduction of an opposite voltage in the range of limitation.

In FIG. 5, line $b$, exceeding of the limitation voltage UD has also been presumed. This is effected by a fixed target signal superposed by a moving target signal. It is true that the basic shape of the signal path is maintained during limitation, i.e. during the time $t1$ through $t2$, due to the opposite voltage $-UG$, and the moving line signal is only slightly weakened. In addition, however, the interference pulses SW1 and SW2 also occur in the manner set forth above in connection with FIG. 4. It can also be seen from line $c$ in FIG. 5 that the two interfering pulses SW1 and SW2 are of opposite polarity with respect to the remaining voltage values occurring in this range.

Figure 6:
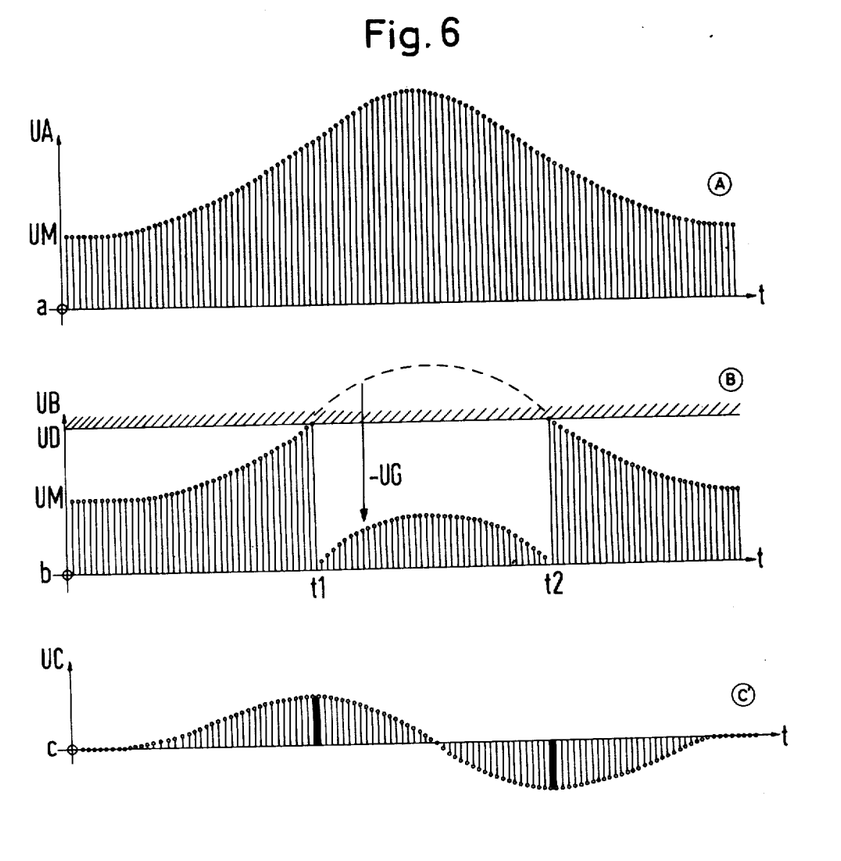
FIG. 6 is a graphic illustration of the form of echo signals with the elimination of interfering signal portions at the beginning and at the end of limitation.
Figure 9:
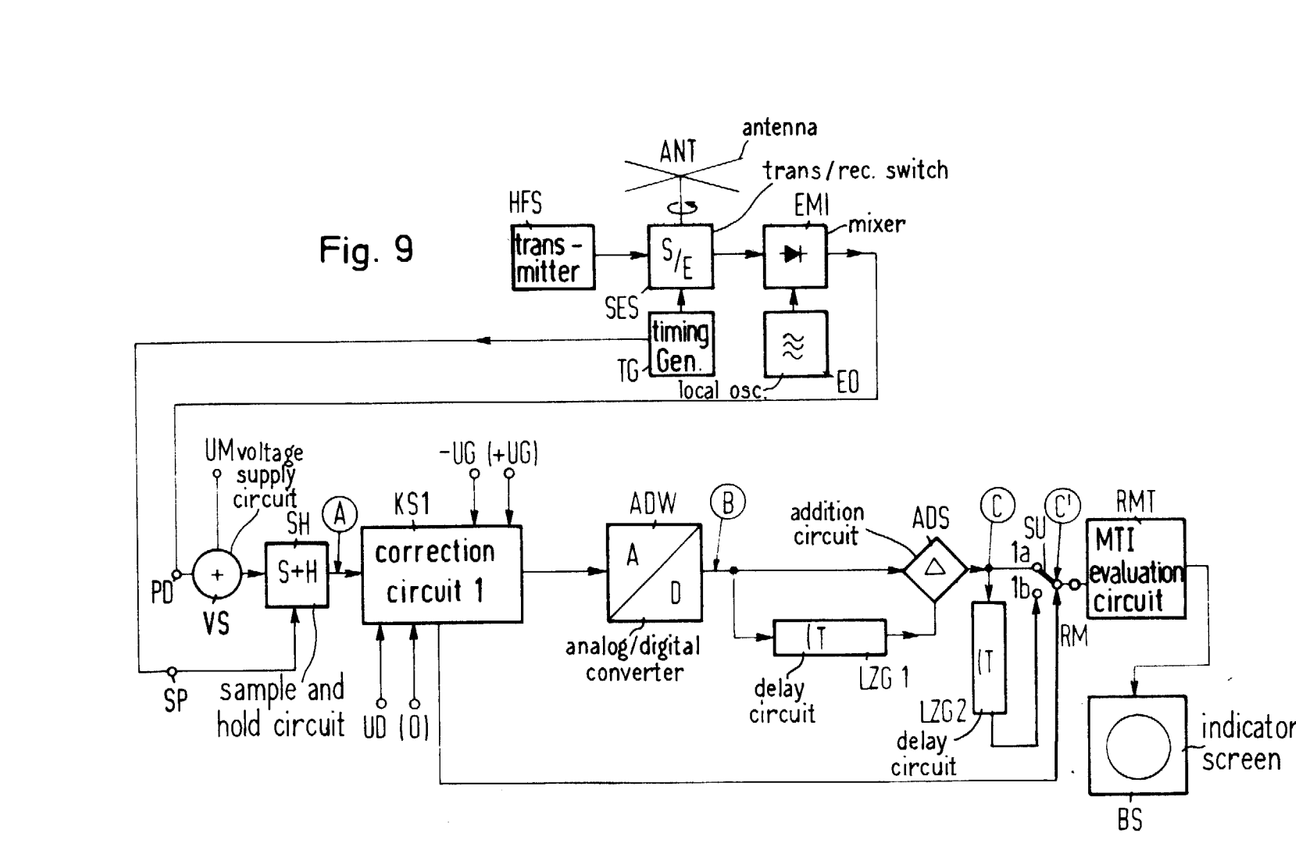
FIG. 9 is a schematic block diagram of a radar device constructed in accordance with the invention having simple correction apparatus.

In the case of the signal path illustrated in FIG. 6, we proceeded from the fact that in accordance with FIG. 9, two interfering voltage values SW1 and SW2 in accordance with FIG. 4 had been eliminated and were replaced by an auxiliary value corresponding to the respectively proceeding value. In order to represent this process more clearly, which can hardly be recognized at this time, the range between two samples in FIG. 6 within which this individual pre-evaluation has been carried out, has been darkened. It is hardly detectible any longer that limitation was employed, and a deformation of the signal path can also hardly be recognized.

Figure 7:
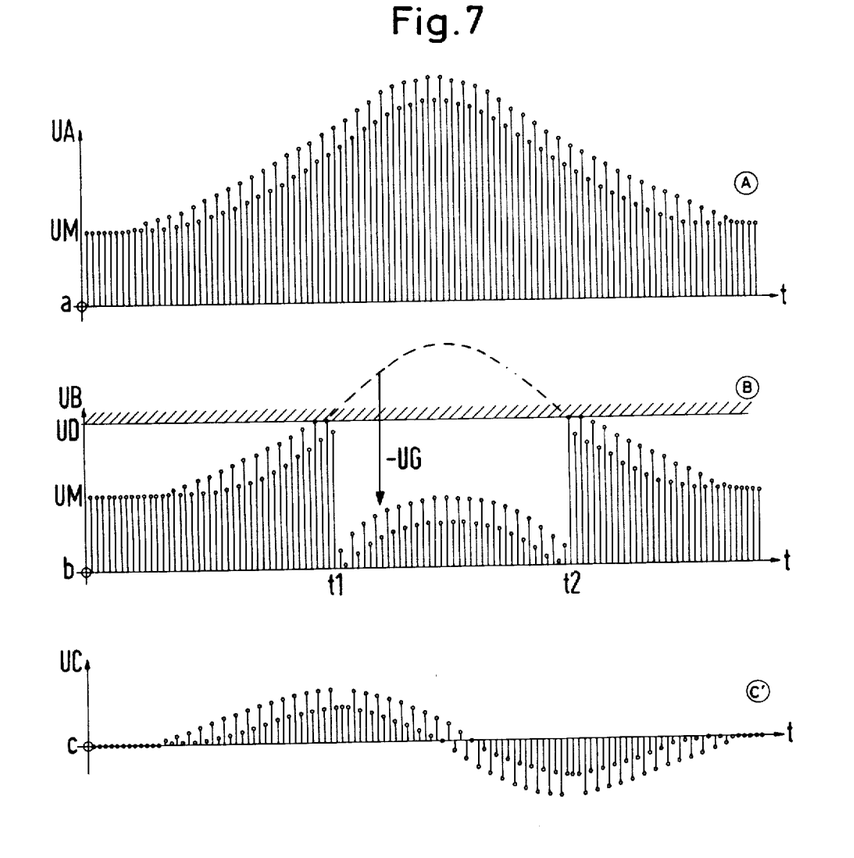
FIG. 7 is a graphic illustration of the form of echo signals which are superposed by moving target echo signals and wherein the interfering signal portions at the beginning and at the end of limitation have been eliminated.

Similar things hold true for the signal path illustrated in FIG. 7 which represents the conditions for FIG. 9 for the case where the interference pulses SW1 and SW2 in accordance with FIG. 5 have been eliminated and replaced by a preceding non-interfered value. Thus, three somewhat similar respective voltage values occur in the range between the time $t1$ and $t2$. As a total, however, the signal path must be considered to be of the type which has not been subjected to interference.

Figure 8:
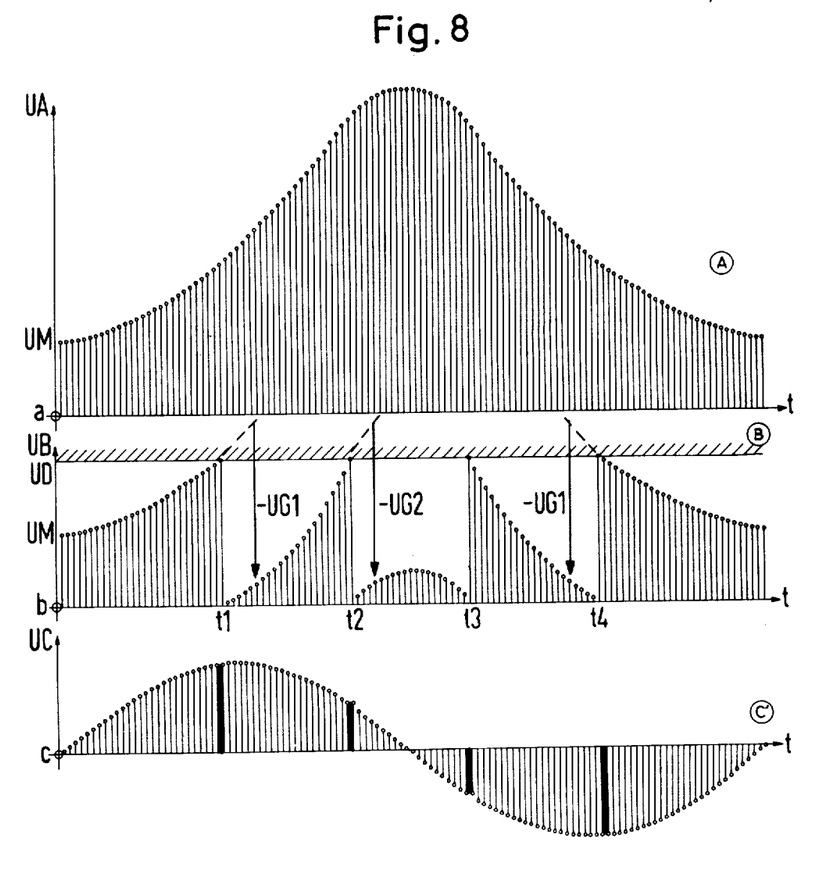
FIG. 8 is a graphic illustration of the application of multiple opposite voltages during limitation.

In the case of the signal in accordance with FIG. 8, a very strong voltage increase is assumed in the line $a$. The maximum values obtained by the voltage UA are so strong that the limitation value UD is reached prematurely. At the time $t1$, the first exceeding of the limitation voltage UD occurs. The subsequent voltage values are so strongly decreased over a first opposite voltage value $-UG1$ that the signal path, first of all, extends below the limitation voltage UD. At the time $t2$, however, the limitation voltage UD is again reached, in spite of the decrease over the voltage $-UG1$. Hereupon, a decrease over a second opposite voltage value $-UG2$ occurs, so that, as a total, the signal values in accordance with line $a$ are decreased over the voltage $(-UG1 - UG2)$, in the time range from $t2$ through $t3$. At the time $t3$, the voltage has decreased to such an extent that the opposite voltage $-UG2$ is not required.

Thus, a decrease results in the time from t3 to t4 which is caused similarly to the increase from t1 to t2 only by the opposite voltage −UG1.

Figure 10:
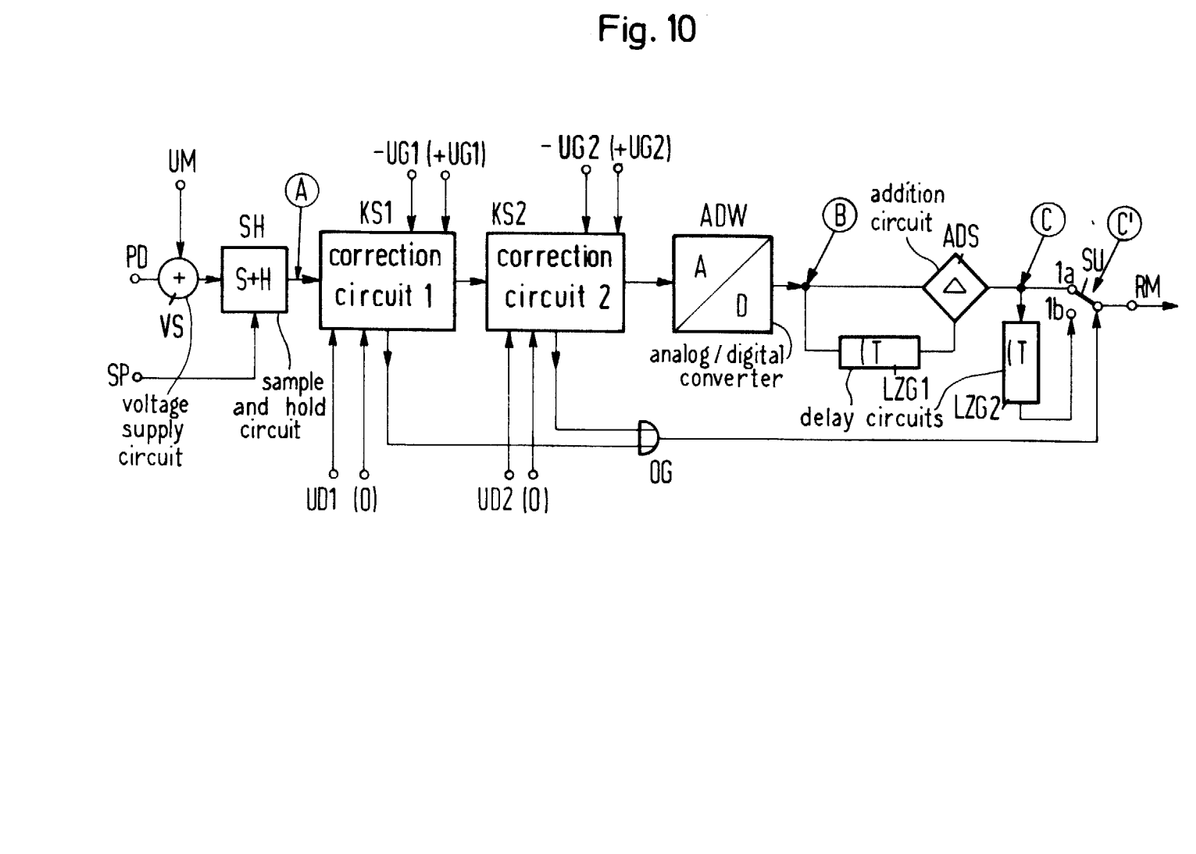
FIG. 10 is a schematic block diagram of a radar device having double correction structure.

If the interference pulses respectively occurring in the case of a large amplitude changes (at t1, t2, t3, t4) are suppressed, and, instead, the respectively preceding voltage value, which is not yet intefered with, is fed in, then a voltage path UC in accordance with line c will result. For this purpose, the voltage values at the times t1, t2 t3 and t4 are again darkened, whereby these values have been formed by way of replacing the preceding value. A circuit arrangement for carrying out the double correction is illustrated in FIG. 10 in block diagram form.

In the case of a circuit arrangement in accordance with FIG. 9, the antenna of a radar device is referenced ANT. This arrangement, which preferably operates as an 360° scanning antenna, is connected with a transmitting-receiving switch SES which, one one hand, transmits the information pulses of the transmission part HFS and, on the other hand, the received pulses of the receiving part, to or from, respectively, the antenna ANT. In order to control the individual processes, a timing generator TG is provided in a manner well-known in the art. The receiving part comprises a mixer stage EMI which has been indicated schematically, and the associated local oscillator is referenced EO. The received signals, mixed coherently, in a prior-art manner, are thus subjected to a further evaluation from the output of the mixer EMI, serving essentially for the suppression of the fixed target signals. This circuit arrangement contains a stage VS, a sample and hold circuit SH, controlled by the timing generator TG, a correction circuit KS1 and an analog-digital converter ADW and a first moving target indicating filter consisting of a delay circuit LZG1 and an additional circuit ADS. A second delay circuit LZG2 is subsequently provided in a parallel branch. The outputs of the direct transmission path are supplied to a terminal 1a, and the output of the transmission path delayed by the member LZG2 is supplied to an output terminal 1b. The delayed (1b) or the undelayed (1a) transmission path is connected with the further evaluation circuit with the help of a switch SU, in a selective manner, the evaluation circuit being referenced RMT. This further evaluation circuit usually contains a threshold, multiple additional moving target indicating filters as well as, possible, an integration low pass filter. At the output of this evaluation circuit, evaluation or indicator systems are connected, for example in the form of a screen BS.

The stage VS supplies the constant voltage value +UM which is equal to half the limitation voltage UD. This is required since the analog-digital converter ADW can only process positive values.

The correction circuit KS1 in accordance with FIG. 9 contains the reference voltage UD as a threshold value (and the value 0 for the lower limitation voltage). These values indicate when it must be anticipated that the threshold value is exceeded by an incoming received signal. It should be pointed out that the signal processing can be carried out both in digital form and in analog form with the correction circuit.

In addition, the opposite voltage value −UG (or +UG, respectively, for the lower limitation voltage zero) is present in this correction circuit KS1. The opposite voltage values are employed as soon as the limitation voltage (for example zero) is exceeded. Therefore, the signal illustrated in FIGS. 4 through 7, respectively in line b, occur at the output of the correction circuit KS1. When the voltage UD causing the limitation is not reached, then the opposite voltage −UG is not added to the signal, and the original signal is again transmitted. The same is also true when the voltage UB = 0 is exceeded for the opposite voltage +UG. In this manner it is guaranteed that the analog-digital converter ADW is not overdriven independent of the size of the input signals which are received by the receiving part of the radar device. In a similar manner, an overdriving of any circuit portions are avoided in the case of an analog signal process.

When the voltage value UD is exceeded (and when the voltage UB = 0 is not reached), a signal will be simultaneously provided from the correction circuit KS1 to the switch SU. This means that the subsequent sensing value occurring at the output of the addition circuit ADS of the transit time moving curve filter ADS/LZG1 is not transmitted. This pulse, which is respectively the next pulse, however, would be the inerference pulse SW1 illustrated in FIGS. 4 and 5, at the time t1. In the place of this value, however, the preceding sensed value, which is delayed over one period T is transmitted to the further evaluation circuit RMT, by way of the terminal 1b. The preceding value at the output of the moving target indication filter, however, is respectively illustrated in line c in FIGS. 4 and 5, and corresponds to the voltage value which is positioned before the gap caused by the signal SW1. After a period T, i.e. before the next sample arrives, the switch SU is again returned to the terminal 1a. Therefore, the further signal path is again transmitted directly from the output of the moving target indicating filter LZG1/ADS. This is effected until the limitation voltage UD is again not reached at the time t2. Even at this time, a control order appears from the correction circuit KS1 to the switch SU which will again be placed onto the terminal 1b. Therefore, the preceding voltage value, i.e. the last sample before the gap, is respectively transmitted before the interference voltage value SW2 occurs, as in FIG. 4. Thus, the signal paths illustrated in line c in FIGS. 6 and 7 are produced.

The delay times T of the transit time members LZG1 and LZG2 are selected equal and correspond to a period duration T of the sensing sample in accordance with FIGS. 1 through 8.

In the case of the circuit arrangement illustrated in FIG. 10, a partial section of the entire radar device in accordance with FIG. 9 has been illustrated. Starting with the terminals PD and SP, the circuit portion required for the correction has been illustrated in detail. The further evaluation of the received signals at the output of the switch SU from the terminal RM is also effected in the manner described in connection with FIG. 9.

The correction circuit KS1 operates in the manner described in connection with FIG. 9, i.e. it determines when the received signal exceeds the adjusted limitation voltage UD1 (or UB = 0, respectively), corresponding respectively to the lines a of FIGS. 1 to 8. At this instant, the opposite voltage −UG1 (or +UG1, respectively) is supplied to the further signal path. Therefore, a signal path results as illustrated in FIG. 8, line b, for the time from t1 through t2. At the time when the limitation voltage UD1 (or UB = 0) is exceeded, i.e. at the time t1, a control signal is processed to the switch SU which is thus switched over from the terminal 1a to the terminal 1b. Therefore, the pre-evaluation is carried out for a period, and the preceding voltage value stored in the member LZG2 is transmited. Hereafter, the switch SU immediately returns to the terminal 1a. The switch SU remains in this position until the time t2. At this time, the limitation voltage UD1 is again exceeded. This remains without effect for the correction circuit KS1. As opposed to this, the subsequently connected correction circuit KS2 is activated. The circuit KS2 contains the second limitation voltage UD2 (or $UB = 0$, respectively) which indicates when a renewed exceeding of the limitation voltage UD in accordance with line b of FIG. 8 occurs. This is the case at the time t2. At this instant, the second opposite voltage $-UG2$ (or $+UG2$, respectively) is applied at the correction circuit KS2. The signal form illustrated in line b of FIG. 8, from t2 to t3, will therefore result. Simultaneously, a control signal is emitted at the time t2 at the output of the correction circuit KS2, and is supplied to the switch SU via the OR gate OG. The switch is therefore again transferred to the terminal 1b for a short time, and it thus transmits the respectively preceding voltage value which is stored in the member LZG2, at the time t2.

At the time t3, the limitation voltage UD2 of the correction circuit KS2 is not reached. This triggers a further control signal via the OR gate OG, to the switch SU, which is again placed onto the terminal 1b for a short time and transmits a pre-value of the voltage. Further in the path, the correction circuit KS2 is not activated. At the time t4, the applied signal voltage at the input of the correction circuit KS1 does not reach the limitation voltage UD1. This terminates the connection of the opposite voltage $-UG1$ and, simultaneously, releases the fourth control order to the switch SU which will again cause temporary application at the terminal 1b, and therefore carries out the pre-evaluation process.

It is also possible to provide further correction circuits, after the correction circuit KS2, to provide a very large dynamic operating characteristic, the correspondingly many limitation voltages and opposite voltages can be utilized for such circuits. The remaining circuit design of the entire arrangement, however, can be maintained unchanged.

Figure 11:
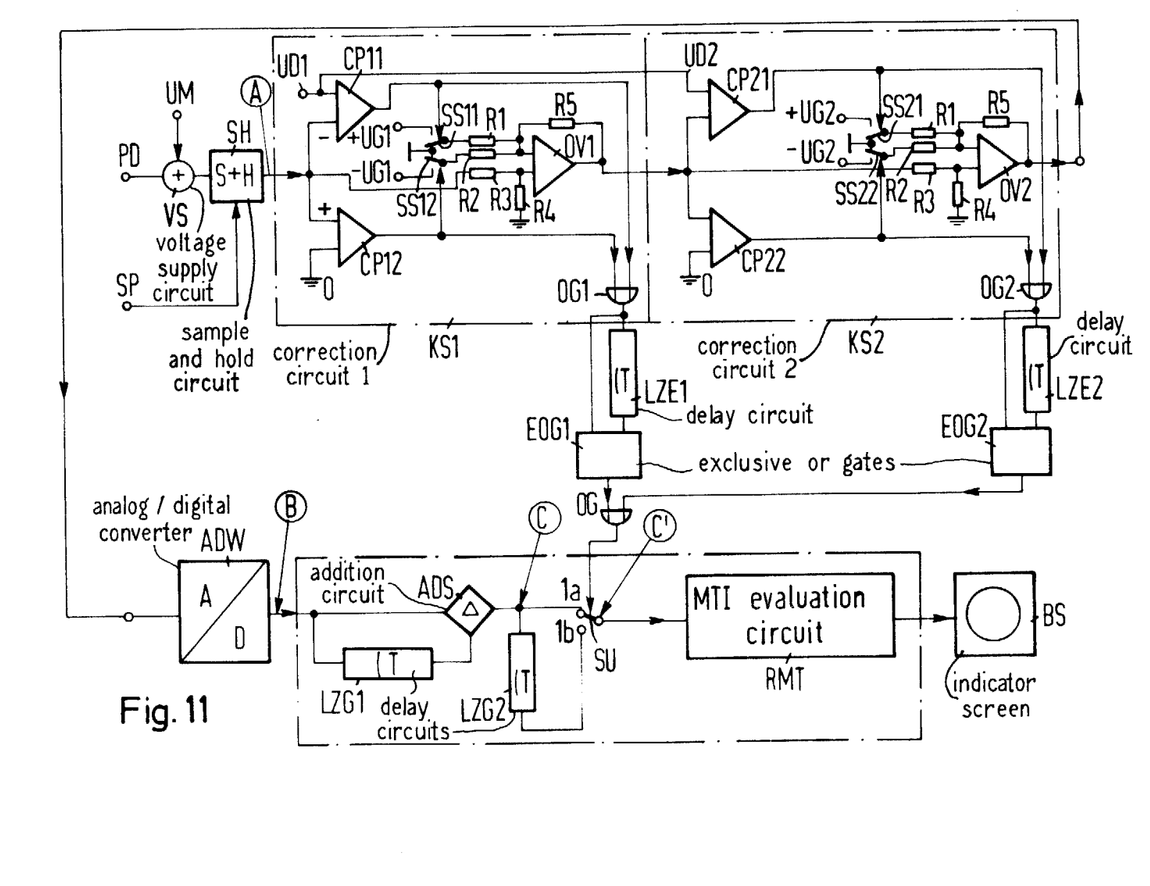
FIG. 11 is a schematic circuit diagram of a radar device constructed in accordance with the principles of FIG. 10.

The switch elements of the correction circuits KS1 and KS2 in accordance with FIG. 10, are represented in the case of the circuit of FIG. 11. The limitation voltages UD1 or zero are supplied to comparators CP11 (at the $-$input) and CP12 (at the $+$ input), respectively, whose second inputs respectively receive the received signal. If the received signal exceeds one of the limitation voltages, then a control order is processed toward the switch SS11 (from CP11) or SS12 (from CP12). Correspondingly, the opposite voltage value $+UG1$ (via SS11) or the opposite voltage value $-UG1$ (from SS12) is processed to the $-$input of an operational amplifier OV1, by way of one of the resistors R1 or R2. The associated $+$input receives the input signal via an L-combination of two resistors R3 and R4. The two resistors R1 and R2, connected to the switches SS11 and SS12, are connected with the output of the operational amplifier OV1 via a further resistor R5. Thus, the input signal, which is decreased by an amount $-UG1$ (or increased by an amount $+UG1$) is provided at its outputs as long as the limitation holds true.

The control orders for the switches SS11 and SS12, via the OR gate OG1, reach an exclusive OR gate EOG1, once undelayed and once delayed by a time T by the transit time member LZE1. This EXCLUSIVE OR gate EOG1 is connected with one of the inputs of the OR gate OG in accordance with FIG. 10 which controls the switch SU.

The design of the correction circuit KS2 is equivalent to that of the correction circuit KS1 and is therefore not explained in detail herein. In the present example, it is assumed that the two limitation voltages UD1 and UD2 are equally large.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

I claim:

1. In a pulse Doppler radar receiver having a moving target indicating filter which has a differentiating effect and in which limiting of the received signals is temporarily effected with a limiter including an analog-digital converter, the improvement therein comprising:
    means for providing an auxiliary voltage which is opposite in polarity to the voltage of the received signal; and
    means for adding the auxiliary voltage to the voltage of the received signal to prevent overdriving and maintain the original envelope.

2. The improved receiver of claim 1, including suppression means for suppressing interference voltages which arise due to the application and removal of the auxiliary voltage.

3. The improved receiver of claim 2, wherein said suppression means comprises means for applying a correction voltage at the output of the moving target indicating filter, corresponding to the preceding voltage value at the output, at the times of application and removal of the auxiliary voltage.

4. The improved receiver of claim 3, said compression means comprising:
    a delay device, having a delay time equal to a period of the radar transmission, connected to the output of the transit-time filter; and
    switch means connected to the delay device and selectively to provide an output signal which is delayed and an output signal which is not delayed by the delay device.

5. The improved receiver of claim 4, wherein said auxiliary voltage means includes means providing a constant auxiliary voltage.

6. The improved receiver of claim 4, wherein said means for providing an auxiliary voltage includes means providing a plurality of different auxiliary voltages, and said means for adding includes means for adding different auxiliary voltages each time the received signal exceeds a predetermined voltage level.

7. The improved receiver of claim 6, comprising at least one correction circuit operable to provide said auxiliary voltage means and said means for adding and connected to and operable to control said switch means.

* * * * *